United States Patent [19]

Takahashi et al.

[11] Patent Number: 4,942,914

[45] Date of Patent: Jul. 24, 1990

[54] HEAVY DUTY AND MEDIUM PNEUMATIC RADIAL TIRE

[75] Inventors: Ken Takahashi, Atsugi; Kazuyuki Kabe, Tokyo; Tatsuo Suzuki, Hayama, all of Japan

[73] Assignee: The Yokohama Rubber Co., Ltd., Tokyo, Japan

[21] Appl. No.: 277,811

[22] Filed: Nov. 30, 1988

[51] Int. Cl.$^5$ ............................. B60C 9/18; B60C 9/28
[52] U.S. Cl. ..................................... 152/531; 152/534; 152/538
[58] Field of Search ............... 152/531, 534, 535, 536, 152/538, 526

[56] References Cited

U.S. PATENT DOCUMENTS

| | | | |
|---|---|---|---|
| 3,335,777 | 8/1967 | Hutch | 152/535 |
| 3,677,319 | 7/1972 | Mirtain | 152/531 X |
| 4,325,423 | 4/1982 | Seitz et al. | 152/531 X |
| 4,669,520 | 6/1987 | Koseki et al. | 152/535 X |
| 4,696,335 | 9/1987 | Tsukagoshi et al. | 152/538 X |
| 4,815,514 | 3/1989 | Hara et al. | 152/531 |

*Primary Examiner*—Raymond Hoch
*Attorney, Agent, or Firm*—Armstrong, Nikaido, Marmelstein, Kubovcik & Murray

[57] ABSTRACT

A heavy duty and medium pneumatic radial tire having a belt layer composed of at least three layers between a carcass layer and a tread, wherein the first belt layer as numbered from the carcass layer towards the tread is separated into two parts at the central region of a crown and at least one organic fiber cord layer is disposed in a space formed by the separation of the first belt layer.

5 Claims, 8 Drawing Sheets

PRIOR ART

FIG. 7 (A) PRIOR ART
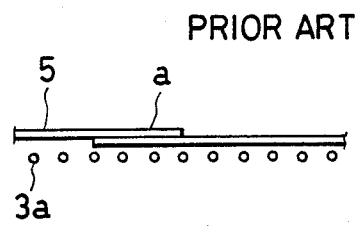
FIG. 7 (C) PRIOR ART
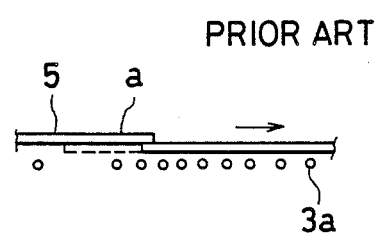
FIG. 7 (B) PRIOR ART
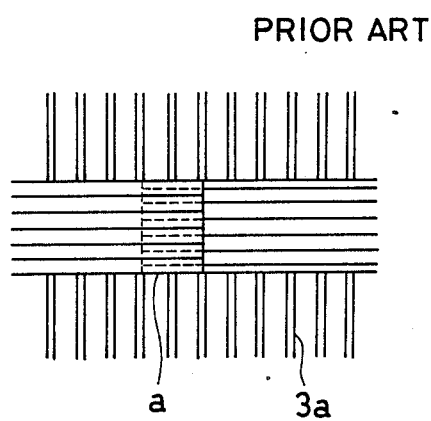
FIG. 7 (D) PRIOR ART
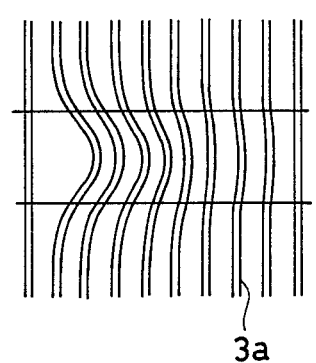
FIG. 8
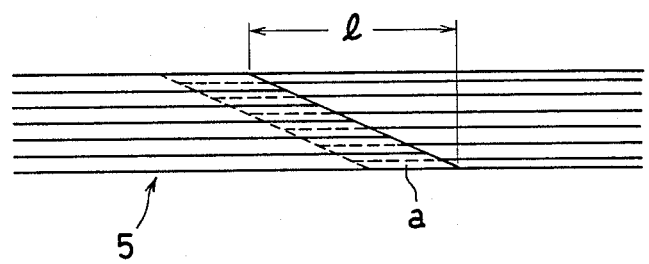

ized is gradu-
ally increased and finally leads to the occurrence of
separation at the end portion of the belt layer.

On the other hand, as described in Japanese patent application Kokai publication No. 61-165514, a proposal has been made on a technique for ensuring the durability of the belt portion under travel conditions on an expressway through the provision of an organic cord layer in a circular form in the circumferential direction of the tire at an angle as low as 0° to 10° relative to the circumferential direction of the tire in the space formed by splitting the first belt layer for the purpose of ensuring the dimensional stability. Although the tire prepared by the above-described technique brings about no problem under permissive load conditions, it brings about a problem under remarkably high load conditions that the driving stability is lower than that of the conventional tire wherein the first belt layer is disposed over substantially the entire region of the crown portion.

In the above-described tire having an organic fiber cord layer disposed on the carcass layer, a lift of the tread portion occurs during vulcanization, so that the splice of the organic fiber cord layer is slipped in the circumferential direction of the tire. The slippage unfavorably brings about the occurrence of cord waves in the carcass layer. Specifically, when an unvulcanized tire is placed in a mold for vulcanization molding, a lift occurs usually with a percentage lift of 2 to 4%. The belt layer copes with the occurrence of the lift through a change in the cord angle and an increase in the cord intervals for elongation in the circumferential direction of the tire. However, it is impossible to take such a measure when the organic fiber cord layer is provided at a cord angle of 0° or so. For this reason, the following measures are taken in the organic fiber cord layer: (1) elongation of the cords themselves through the tension of the cord caused by the lift and (2) slippage, in the circumferential direction of the tire, of each end portion of the splice formed by bonding one end of the organic fiber cord layer to the other end thereof through polymerization during molding of the tire.

However, with respect to the above-described measure (1), since the cord tension applied to the organic fiber cord layer during vulcanization is 2 to 3 kg/cord, an organic fiber exhibiting a high elongation should be used in order to cope with a percentage lift of 2 to 4% through elongation of the cords themselves, which brings about a lowering in the reinforcing effect of the organic fiber cord layer, i.e., makes it impossible to attain the primary object of the use of the organic fiber cord layer. With respect to the above-described measure (2), when the degree of the slippage is large, a shearing force accompanying the shift of the organic fiber cord layer in the circumferential direction of the tire is applied to the carcass layer, so that the cords of the carcass layer disposed in the radial direction brings about a change in the cord angle in a wavy form at the splices because at that time the tire is in an unvulcanized state. These phenomena are shown in FIGS. 7(A), (B), (C), and (D). FIG. 7(A) is a cross-sectional view of a splice of an organic fiber cord layer in an unvulcanized state; FIG. 7(B) is a plain view of the splice shown in FIG. 7(A); FIG. 7(C) is a cross-sectional view of the state of the slippage of a splice of an organic fiber cord layer after vulcanization; and FIG. 7(D) is a plain view of the splice shown in FIG. 7(C). In FIGS. 7(A) and

HEAVY DUTY AND MEDIUM PNEUMATIC RADIAL TIRE

BACKGROUND OF THE INVENTION

The present invention relates to a belt structure of a pneumatic radial tire and more particularly to a heavy duty and medium pneumatic radial tire improved in not only the durability of the crown portion on a rough road through the formation of a split structure in the first belt layer but also the dimensional stability and the durability of the belt layers during travelling on an expressway.

A conventional heavy duty and medium pneumatic radial tire adapted for use in trucks and buses or light trucks comprises, e.g., as shown in FIG. 5, a multiple belt layer 4 disposed between a tread 2 and a carcass layer 3 of a tire 1, said belt layer 4 being composed of a belt reinforcing layer $4_1$ (the first belt layer) having a cord angle of 40° to 75° relative to the circumferential direction of the tire disposed adjacent to the carcass layer 3 and, superimposed on the belt reinforcing layer $4_1$, at least two belt tension-resistant layers $4_2$ and $4_3$ (the second and third belt layers) each having a cord angle of 10° to 30° relative to the circumferential direction of the tire and disposed so as for the cords constituting the second belt layer to cross those constituting the third belt layer. In this case, the carcass layer 3 has a monolayer of multi-layer structure. The cords of the carcass layer are each provided at an angle of about 90° relative to the circumferential direction of the tire (i.e., substantially in a radial direction).

In a radial tire shown in FIG. 5, the dimensional stability is ensured by disposing the belt reinforcing layer $4_1$, i.e., the first belt layer, over substantially the entire region of the crown portion in order to reinforce the crown portion so as to withstand the inflation pressure of the tire, and an excellent effect of improving uneven wear resistance and driving stability is attained by enhancing the sectional bending rigidity in a radial direction of the tire (i.e., a widthwise direction of the tire) over the entire ground-contacting area of the tread. However, it is difficult for this tire to trace changes in the profile of the road surface having unevennesses, such as stones or protrusions, which brings about problems that the stress concentration attributed to the unevenness of the road causes the central region of the crown to be damaged and, further, the cords of the belt layer within the tire to be broken.

In order to eliminate these drawbacks, a tire having a structure shown in FIG. 6 has been adopted mainly for use on a rough road. In this tire, the belt reinforcing layer $4_1$ is removed from the central portion of the crown and divided into two parts to dispose them respectively on both shoulder portions, i.e., to form a split structure, thereby imparting flexibility to the central region of the crown susceptible to stress concentration and relaxing the stress through a lowering in the sectional bending rigidity in the radial direction of the central region of the crown. Although this split structure hardly brings about any problem in the case of a tire for use on a rough road having a short travel life, it makes the shape of the crown portion unstable (particularly brings about an increase in the growth of the outer periphery of the central portion of the crown) due to a lowering in the belt reinforcing function of the central portion of the crown. This brings about another problem that the strain between the tension-resistant layers $4_2$ and $4_3$, i.e., the second and third belt layers (B), an organic fiber cord layer 5 is disposed on a carcass layer comprising carcass cords 3a. Letter a designates a splice. After vulcanization, as indicated by a dotted line in FIG. 7(C), the splice of the organic fiber cord layer 5 on the carcass layer side is slipped in a direction shown by an arrow due to the lift during vulcanization, which brings about relative shift of the laps of the splices. As shown in FIG. 7(D), this in turn causes the carcass cords 3a to undergo a change in the cord angle in a wavy form at the splice thereof.

When the vulcanization is conducted in such a state that the cord angle is changed in a wavy form, a carcass cord wave is formed, so that when the tire is filled with air, there occurs a force causing the carcass cords to be radially orientated due to the tension. This unfavorably brings about an increase in the ply steer force and a lowering in the durability of the belt layer.

In particular, a large degree of slippage in the circumferential direction of the tire at the splice occurs when the organic fiber cord layer has a single layer structure. When the organic fiber cord layer is formed to have a double layer structure, the degree of slippage can be reduced to such an extent that the above-described adverse effect becomes negligible. However, in this case, since the degree of slippage is remarkably small, the elongation of the organic fiber cord layer should be increased in order to cope with the lifting. This brings about not only an increase in the growth of the outer periphery of the tire after vulcanization but also a lowering in the durability of the belt portion.

SUMMARY OF THE INVENTION

An object of the present invention is to provide a heavy duty and medium pneumatic radial tire ensuring not only the durability of the belt layer under conditions of travel on an expressway but also driving stability under high load conditions through a remarkable improvement in the dimensional stability while ensuring the durability of the crown on a rough road.

In order to attain the above-described object, the present invention relates to a heavy duty and medium pneumatic radial tire having a belt layer composed of at least three layers each made of a metallic cord and disposed between a carcass layer and a tread, wherein (1) cords constituting the second belt layer as numbered from the carcass layer towards the tread and cords constituting the third belt layer as numbered from the carcass layer towards the tread are each provided at an angle of 10° to 30° relative to the circumferential direction of the tire and cross each other, preferably the cords of the second belt layer and the cords of the third belt layer are provided respectively at cord angles of 24° to 30° and 10° to 16° relative to the circumferential direction of the tire and cross each other, (2) the first belt layer is separated into two parts at the central region of a crown and respectively disposed on both shoulder portions, said first belt layer being provided at a cord angle of 40° to 75° relative to the circumferential direction of the tire, and (3) at least one organic fiber cord layer having a cord angle of 0° to 10° relative to the circumferential direction of the tire is provided in a circular form in the circumferential direction of the tire in a space formed by the separation into two parts of the first belt layer between the carcass layer and the second belt layer at the central region of the crown and the total tensile strength of the cords of the organic cord layer is 240 kg/cm or more.

In the present invention, it is preferred that the above-described tire additionally have the following features: (4) one end of said organic fiber cord layer in the circumferential direction of the tire and the other end thereof are each diagonally cut and the cut ends are lapped on each other to form a splice in such a manner that the distance in the circumferential direction of the tire between one end in the widthwise direction of each cut end and the other end thereof is 120 mm or more, (5) the space between said organic fiber cord layer and said carcass layer is 0.8 mm or more before vulcanization, and (6) the elongation of the cords of said organic fiber cord layer under a load of 2.0 g/d is 5% or more before vulcanization and 11% or less after vulcanization.

This and other objects will be apparent from the following detailed description.

BRIEF DESCRIPTION OF THE DRAWINGS

FIG. 7(A) is a cross-sectional view of a splice of an organic fiber cord layer before vulcanization;

FIG. 7(B) is a plain view of the splice shown in FIG. 7(A);

FIG. 7(C) is a cross-sectional view of a splice of an organic fiber cord layer after vulcanization showing the slippage of the splice;

FIG. 7(D) is a plain view of the splice shown in FIG. 7(D);

FIG. 8 is an enlarged view of a splice of an organic fiber cord layer;

DETAILED DESCRIPTION OF THE PREFERRED EMBODIMENTS

Figure 1:
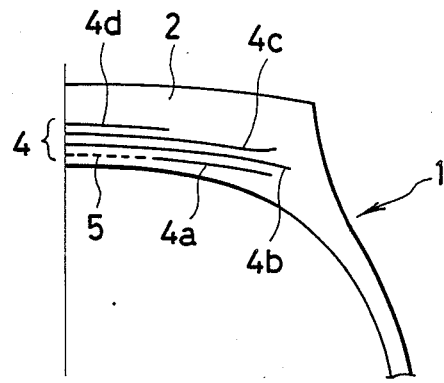
FIG. 1 is a meridian semicross-sectional view of an example of the principal part of a radial tire according to the present invention.
Figure 2:
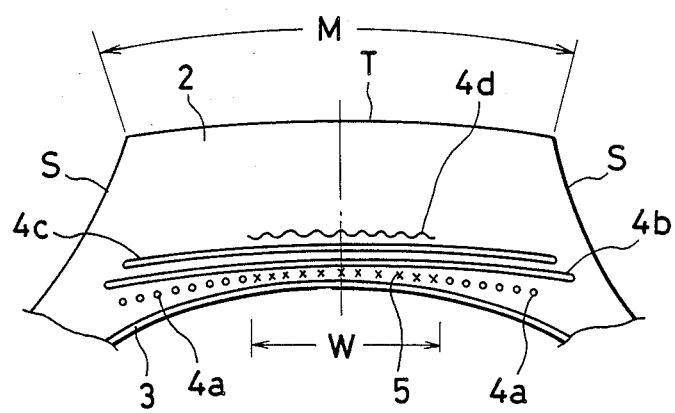
FIG. 2 is an enlarged view of the principal part shown in FIG. 1.

In a tire 1 shown in FIGS. 1 and 2, a belt layer 4 comprising metallic cords, such as steel cords, is disposed between a carcass layer 3 and a tread 2. This belt layer 4 comprises at least three layers, i.e., the first belt layer 4a, the second belt layer 4b, the third belt layer 4c, and the fourth belt layer 4d in that order from the carcass layer 3 towards the tread 2. The carcass layer may comprise at least one layer.

(a) In the present invention, the following features are specified in the above-described tire 1.

(1) Cords of the second belt layer 4b as numbered from the carcass layer 3 towards the tread 2 and cords of the third belt layer 4c as numbered from the carcass layer 3 towards the tread 2 are each provided at an angle of 10° to 30° relative to the circumferential direction of the tire and cross each other.

It is preferred that the cords of the second belt layer 4b and those of the third belt layer 4c cross each other in the circumferential direction of the tire and provided at cord angles of 24° to 30° and 10° to 16°, respectively, relative to the circumferential direction of the tire.

When the first belt layer has a split structure, the driving stability under heavy load conditions is lowered. The lowering in the driving stability is reflected in the lowering in both the steerage and the response of the steering. For this reason, a tire having a split structure imparts to a vehicle a higher tendency of oversteering than that of the conventional tire having no split structure.

Accordingly, in the present invention, the lowering in both the steerage and the response of the steering are prevented by providing the cords of the second belt layer 4b and those of the third belt layer 4c so as to cross each other in the circumferential direction of the tire and each have a cord angle of 10° to 30° relative to the circumferential direction of the tire. When the cords are provided at an angle exceeding 30°, the total stress occurring at the end of the cords in the direction of the cords during cornering is remarkably increased, so that there occurs the separation at the end of the cords. On the other hand, when the cord angle of the belt layer crossing the belt layer having a cord angle of 24° to 30° is less than 10°, these belt layers are remarkably poor in the symmetry, which brings about an increase in the ply steer force, resulting in a lowering in the straight travel stability and the occurrence of uneven wear.

(2) The first belt layer 4a is separated into two parts at the central region T of the crown and respectively provided on both shoulder portions S, S, and the cords of the first belt layer 4a are provided at an angle of 40° to 75° relative to the circumferential direction of the tire.

It is preferred that the space W between the two parts formed by the separation of the first belt layer 4a at the central region T of the crown be 25 to 45% of the ground-contacting width of the tread. When the space is less than 25%, it is difficult to relax the stress of the central region T of the crown through a lowering in the bending regidity in the radial direction of the central region T of the crown susceptible to stress concentration. On the other hand, when the space exceeds 45%, an effect of the first belt layer 4a for reinforcing the shoulder portion S is lowered, so that there occurs uneven wear at the shoulder portion S.

When the first belt layer 4a is provided at a cord angle of less than 40° relative to the circumferential direction of the tire, it is impossible to ensure necessary bending rigidity in the sectional direction of the tire, which brings about a lowering in the travel stability during cornering as well as in the resistance to uneven wear. On the other hand, when the cord angle exceeds 75°, a lowering in the travel stability on a rutted road occurs because the bending rigidity in the sectional direction of the tire is excessively increased (3) At least one organic fiber cord layer 5 having a cord angle of 0° to 10° relative to the circumferential direction of the tire is disposed in a circular form in the circumferential direction of the tire in the space formed by the separation of the first belt layer between the carcass layer 3 and the second belt layer 4b, and the total cord tensile strength of the organic cord layer 5 is 240 kg/cm or more per unit width.

As described above, the first belt layer 4a is separated into two parts at the central region T of the crown, i.e., formed so as to have a split structure, to lower the sectional bending rigidity in the radial direction of the tire in the central region of the crown susceptible to stress concentration attributable to unevennesses on a road surface, such as stones or protrusions, thereby ensuring an effect of relaxing the stress, and, at the same time, at least one organic fiber cord layer 5 is provided in the space formed by the separation of the first belt layer 4a between the carcass layer 3 and the second belt layer 4b to enhance the reinforcing effect in the circumferential direction of the tire, thereby preventing a lowering in the dimensional stability of the tread portion attributed to the lowering in the function of the belt layer for reinforcing the central region of the crown, i.e., a drawback of the conventional split structure. The organic fiber cord layer 5 may have a monolayer structure. This is because when the organic fiber cord layer has a multilayer structure, a shearing force is applied between the layers, which brings about an increase in the rolling resistance.

The organic fiber cord layer 5 comprises cords of, e.g., nylon, polyester or aromatic polyamide fibers.

The cord angle of the organic fiber cord layer 5 in the circumferential direction of the tire is preferably small from the viewpoint of ensuring the dimensional stability, i.e., 10° or less, preferably 5° or less, more preferably 0° or so.

The total tensile strength of the cords of the organic fiber cord layer 5 is 240 kg/cm or more per unit width, preferably 300 kg/cm or more per unit width. The term "total tensile strength" used herein is intended to mean the product of the cord end count and the cord tensile strength and represented by the following equation:

$$F = \Sigma n_i f_i$$

wherein
F is the total tensile strength;
$n_i$ is the cord end count per unit width of the organic fiber cord (1/cm); and
$f_i$ is the breaking tensile strength of the organic fiber cord (kg).

The fourth belt layer 4d is disposed as a protective layer according to need and comprises steel cords, aromatic polyamide fiber cords (trade name: Kevlar), or the like. The cord angle is 10° to 30° relative to the circumferential direction of the tire, preferably an angle close to the cord angle of the third belt layer 4c. The cords may be provided so as to parallel or cross the cords of the third belt layer 4c.

(b) In the present invention, it is preferred that the tire having the above-described features (1) to (3) further meet the following requirements (4) to (6).

(4) One end of said organic fiber cord layer 5 in the circumferential direction of the tire and the other end thereof should be each diagonally cut, and the cut ends should be lapped on each other to form a splice in such a manner that the distance in the circumferential direction of the tire between one end in the widthwise direction of each cut end and the other end thereof is 120 mm or more.

FIG. 8 is an enlarged view of the splice. In FIG. 8, the distance 1 in the circumferential direction of the tire between one end and the other end in the widthwise direction of the cut end in the splice a is 120 mm or more, preferably 150 mm or more.

When the distance is less than 120 mm, the force acting on the carcass layer caused by the slippage in the circumferential direction of the tire cannot be dispersed, which brings about an increase in the cord wave occurring in the carcass layer.

Figure 9:
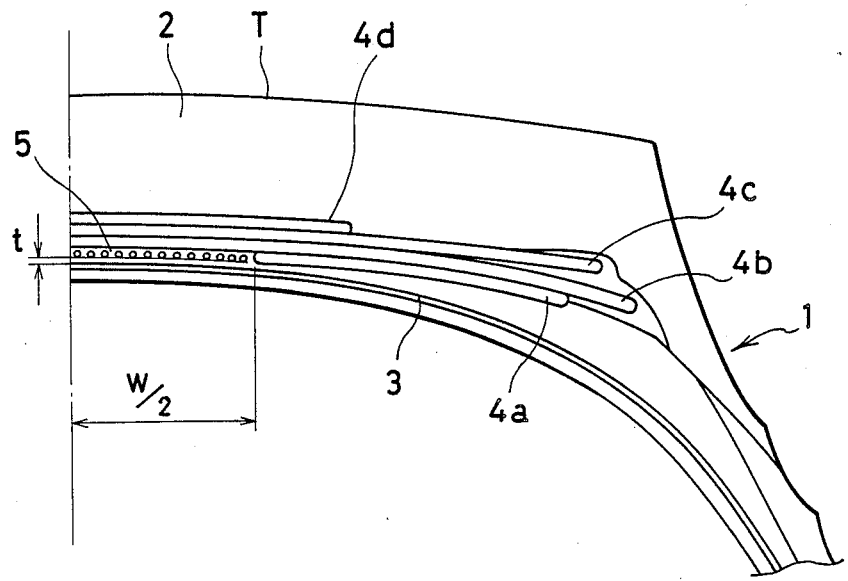
FIG. 9 is an enlarged view of another example of the principle part of a radial tire according to the present invention.

(5) The space t between the organic fiber cord layer 5 and the carcass layer 3 should be 0.8 mm or more before vulcanization (see FIG. 9).

This is because the force caused by the slippage of the splice in the circumferential direction of the tire must be relieved.

(6) The elongation of the cords of the organic fiber cord layer 5 under a load of 2.0 g/d should be 5% or more in an unvulcanized state and 11% or less after vulcanization, said elongation being measured according to JIS L 1017.

When the elongation in an unvulcanized state is less than 5%, the elongation of the cords is reduced, while the degree of the slippage of the splice in the circumferential direction of the tire is increased that much, which brings about an increase in the cord wave of the carcass layer. On the other hand, when the elongation after vulcanization exceeds 11%, the growth of the outer periphery of the tire during filling of the air is so large that the durability of the belt layer is lowered.

The present invention will now be described with reference to the following Examples.

EXAMPLE 1:

The following tire samples were prepared and subjected to the evaluation of the durability of the belt layer.

Tire Samples tire size: 10.00 R 20
structure of belt layer: shown in FIG. 1
organic fiber cord layer: 1260 D/2; 8.4 cords/cm×2 pies (the two plies were both arranged in such a direction as will cross the second belt layer 4b); F=336 kg/cm; angles varied.
ground-contacting width of tread: 185 mm
space formed by the separation of the first belt layer 4a: 60 mm
specifications of belt layer: shown in Table 1

TABLE 1

| | steel cord | cord end count (1/cm) | lay | angle | width |
|---|---|---|---|---|---|
| first belt layer | 3(0.20) + 6(0.38) | 4.4 | left down-ward | 60° | 50 mm |
| second belt layer | 3(0.20) + 6(0.38) | 5.6 | left down-ward | 18° | 175 mm |
| third belt layer | 3(0.20) + 6(0.38) | 5.6 | right down-ward | 18° | 160 mm |
| fourth belt layer | 3(0.20) + 6(0.38) | 3.6 | right down-ward | 18° | 75 mm |

Evaluation of durability of belt layer

The growth of the outer periphery of the tire was measured after travelling of the tire for 10 hr under conditions of a pneumatic pressure of 7.2 kg/cm$^2$, a load of 2000 kg, and a speed of 81 km/hr, and the durability was judged based on the magnitude of the growth. The results are shown in FIG. 3.

Figure 3:
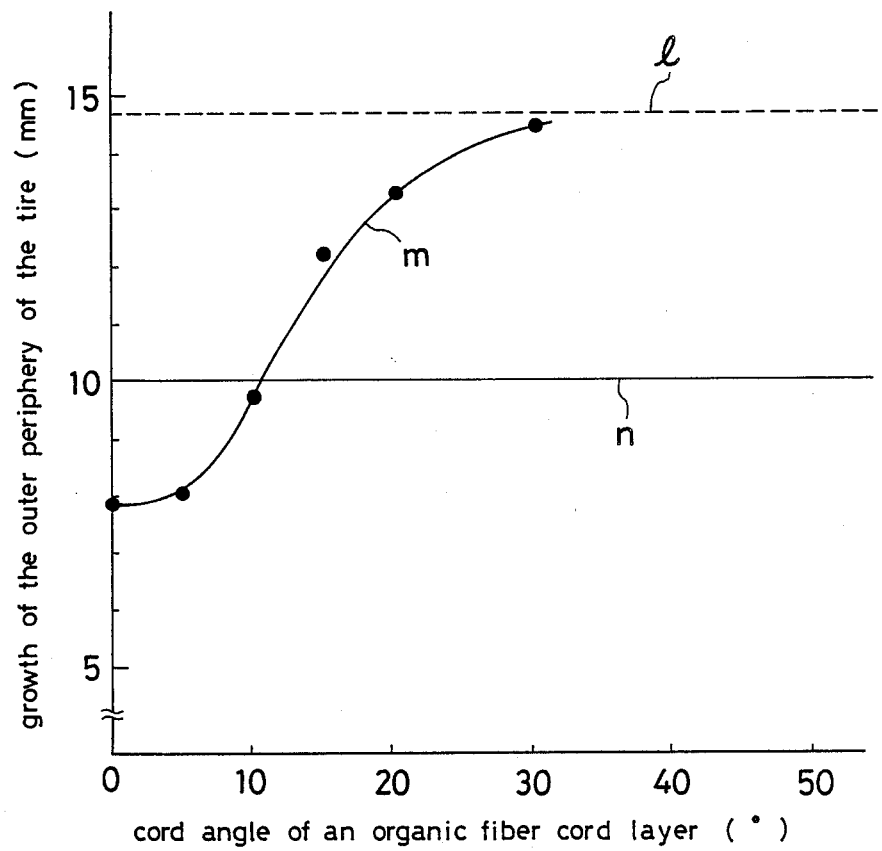
FIG. 3 is a graph showing the relationship between the cord angle of an organic fiber cord layer and the growth of the outer periphery of the tire.

In FIG. 3, the letter l represents the results in the case where no organic fiber cord was used. In this case, the growth of the outer periphery was 14.8 mm. Letter n represents the limit of the growth of the outer periphery of the tire based on the knowledge acquired up to date.

It is judged from FIG. 3 that when the growth is 10 mm or less, the dimensional stability suffices for the durability of the belt layer. Therefore, the cord angle of the organic fiber cord layer relative to the circumferential direction of the tire is 10° or less, preferably 5° or less.

Figure 4:
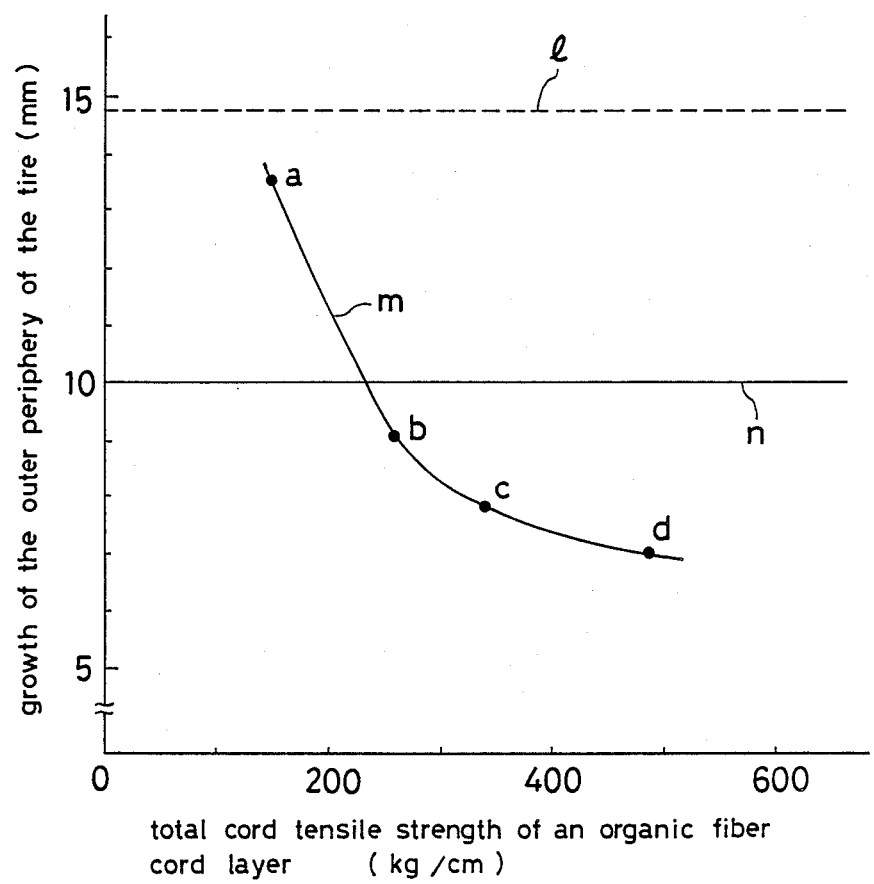
FIG. 4 is a graph showing the relationship between the total cord tensile strength of an organic fiber cord layer and the growth of the outer periphery of the tire.
Figure 5:
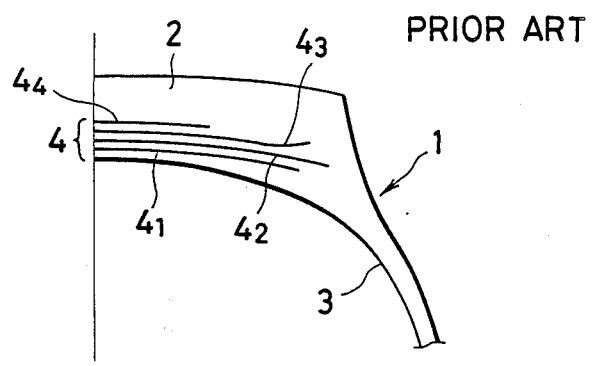
FIGS. 5 and 6 are each a meridian semicross-sectional view of an example of the principal parts of a conventional radial tire.
Figure 6:
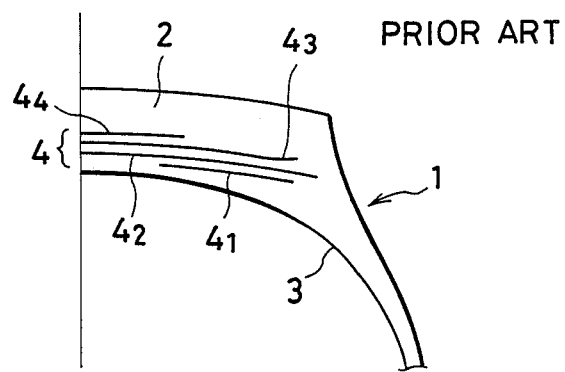

EXAMPLE 2:

The following tires (a), (b), (c), and (d) were prepared in the same manner as that of Example 1, except that the cord angle of the organic fiber cord layer was 0° and the total tenacity of the cords F was varied. These tires were subjected to the evaluation of the relationship between the growth of the outer periphery of the tire and the total tensile strength of the cords of the organic fiber cord layer. The results are shown in Table 4. The length of the outer periphery of the tire having a structure shown in FIG. 5 was 7.55 mm. Letters l, m, and n in FIG. 4 are each as defined above in connection with FIG. 3.

tire (a): nylon cord; 1260 D/2; 7.6 cords/cm; 1 ply; F=152 kg/cm; growth of outer periphery=13.5 mm
tire (b): nylon cord; 1890 D/2; 7.8 cords/cm; 1 ply; F=234 kg/cm; growth of outer periphery=9.1 mm
tire (c): nylon cord; 1260 D/2; 8.4 cords/cm; 2 plies; F=336 kg/cm; growth of outer periphery =7.8 mm
tire (d): nylon cord; 1890 D/2; 7.8 cords/cm; 2 plies; F=468 kg/cm; growth of outer periphery =7.0 mm It is apparent from FIG. 4 that the total tensile strength F is preferably 240 kg/cm or more, more preferably 300 kg/cm or more.

Although a nylon cord was used in this Example, an aramid fiber cord [an aromatic polyamide fiber cord; Kevlar (trade name)] may also be used.

EXAMPLE 3:

The following tire samples were prepared and subjected to the evaluation of the durability of the belt layer (dimensional stability) and driving stability.

Tire samples types of tire: tires A to H
tire size: 10.00 R 20 14 PR ribbed
structure of belt layer: shown in FIG. 1
organic fiber cord layer: 1890 D/2 of nylon; end count of 9.2 cords/cm; cord angle of 0° relative to the circumferential direction of the tire
F=275 kg/cm
ground-contacting width of tread: 185 mm
space formed by the separation of the first belt layer 4a: 60 mm
specifications of belt layer: shown in Table 1
Tire H has the same structure as that described above, except that the first belt layer 4a is a conventional full type belt layer and has a width of 160 mm.

TABLE 2

| | steel cord | cord end count (1/cm) | lay | width |
|---|---|---|---|---|
| first belt layer | 3(0.20) + 6(0.38) | 4.4 | left downward | 50 mm × 2 |
| second belt layer | 3(0.20) + 6(0.38) | 5.6 | left downward | 175 mm |
| third belt layer | 3(0.20) + 6(0.38) | 5.6 | right downward | 160 mm |
| fourth belt layer | 3(0.20) + 6(0.38) | 3.6 | right downward | 75 mm |

Evaluation of durability of belt layer

The growth of the outer periphery of the tire was measured after travelling of the tire for 10 hr under conditions of an inflation pressure of 7.2 kg/cm$^2$, a load of 2000 kg, and a speed of 81 km/hr, and the durability was judged based on the magnitude of the growth. It is judged from the knowledge acquired up to date that when the growth is 10 mm or less, the dimensional stability suffices for the durability of the belt layer. The results are shown in Table 3.

Evaluation of driving stability

The driving stability was evaluated by making use of an actual vehicle (feeling test).
vehicle: 4 wheels, 2 driven
rim: 20×7.00 T
pneumatic pressure: 7.2 kg/cm$^2$
load:
front wheel: 5.2 ton/axle
rear wheel: 9.0 ton/axle The rating of tires ranged from 1 to 100 marks, and the tires which had got at least 70 marks were regarded as an acceptable one. The results are shown in Table 3.

TABLE 3

| | cord angle | | growth of outer periphery of tire (mm) | evaluation of driving stability (marks) | | | acceptance or rejection on durability | acceptance or rejection on driving stability |
|---|---|---|---|---|---|---|---|---|
| tire | second belt layer | third belt layer | | steerage | response of steering | rolling characteristics | | |
| A | 18° | 18° | 8.7 | 68 | 68 | 70 | accepted | rejected |
| B | 22° | 22° | 12.5 | 73 | 72 | 73 | rejected | accepted |
| C | 24° | 18° | 11.0 | 73 | 72 | 73 | rejected | accepted |
| D | 24° | 16° | 9.5 | 73 | 73 | 73 | accepted | accepted |
| E | 24° | 14° | 7.5 | 72 | 73 | 72 | accepted | accepted |
| F | 22° | 14° | 7.5 | 72 | 71 | 69 | accepted | rejected |
| G | 20° | 14° | 7.3 | 71 | 68 | 68 | accepted | rejected |
| H | 18° | 18° | 8.5 | 73 | 73 | 72 | — | — |

Note:
the first belt layer in each of tires A to G: split type + nylon reinforcing layer
the first belt layer in tire H: full type It is apparent from Table 3 that tires D and E wherein the cord angles of the second belt layer and the third belt layer are 24° to 30° and 10° to 16°, respectively, are excellent in the durability of the belt layer and the driving stability.

EXAMPLE 4:

Tire I was prepared in the same manner as that described in Example 1 in connection with the preparation of tire E, except that the cord angles of the second and third belt layers were reversed (cord angle of the second belt layer: 14°; cord angle of the third belt layer: 24°). These tires E and I were subjected to the evaluation of the cornering power (CP) and driving stability. The results are shown in Tables 4 and 5.

TABLE 4

| | tire E | tire I |
|---|---|---|
| CP | 245 kg/deg | 227 kg/deg |

Note:
A.P.: 7.2 kg/cm$^2$
load: 2700 kg
rim: 20 × 7.00 T

TABLE 5

| | steerage | response of steering | rolling characteristics |
|---|---|---|---|
| tire E | 72 | 73 | 72 |
| tire I | 69 | 68 | 73 |

It is apparent from Tables 4 and 5 that good results can be attained when the cord angle of the third belt layer is small. This is because the cornering power greatly acts on the belt layer on the groundcontacting side of the thread and when the cornering power is low, linear steering characteristics are lost particularly in the case of a large steering angle.

EXAMPLE 5:

The following tire samples were prepared, and combination of the distance l in the circumferential direction of the tire with space t was varied to evaluate the carcass cord wave (CW) after vulcanization.

Figure 10:
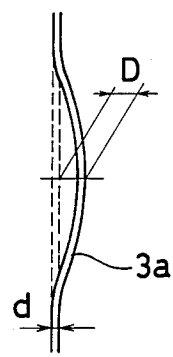
FIG. 10 is an illustrative view showing how to examine a carcass cord wave.

Tire samples
tire size: 10.00 R 20
structure of belt layer: shown in FIGS. 1 and 9
carcass cord: 3+9+15 (0.175)$^{1w}$
cord diameter: 1.17 mm
length of splice in the circumferential direction of the tire: l=0 mm, 60 mm, 120 mm, 150 mm
organic fiber cord layer: 1890 D/2 of nylon; end count of 9.2 cords/cm
F=275 kg/cm
elongation at specified load (elongation of cord under a load of 2.0 g/d): 9% before vulcanization
space between the organic fiber cord layer and the carcass layer: t=0.5 mm, 0.8 mm, 1.1 mm CW was evaluated as follows. As shown in FIG. 10, the cord diameter of the carcass cord 3a was assumed to be d, and the amount of the shift of the carcass cord 3a relative to the cord diameter d was assumed to be D. The D to d ratio (D/d) was calculated to obtain CW rating (n) (n=D/d). It was judged from the knowledge acquired up to date that when the maximum value of n was 4 or less, the tire could withstand a long-term use and had excellent durability.

Figure 11:
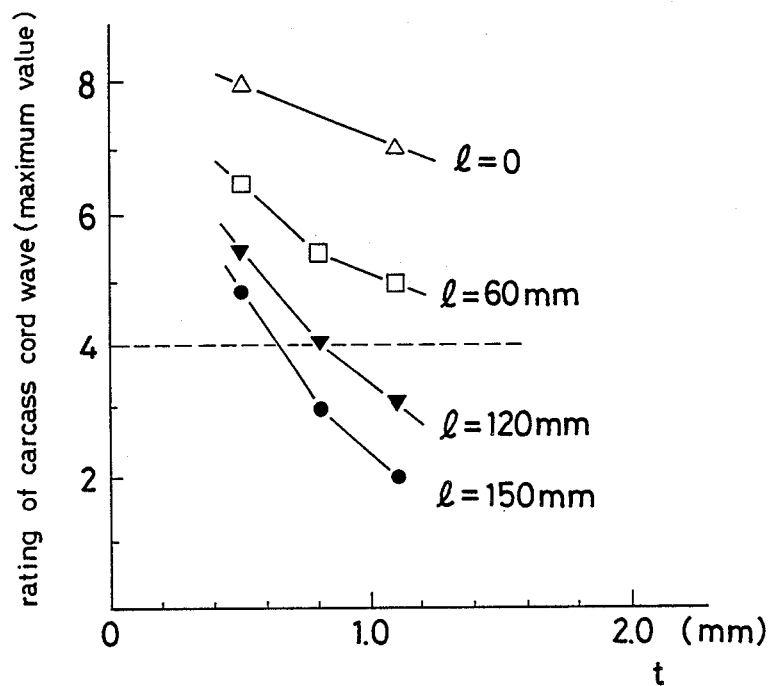
FIG. 11 is a graph showing the relationship between the distance, t, between an organic fiber cord layer and a carcass layer and the rating of carcass cord wave (CW)

The results are shown in FIG. 11. It is apparent from FIG. 11 that the maximum value of n is 4 or less when t and l are 0.8 mm or more and 120 mm or more, respectively.

EXAMPLE 6:

The following tire samples were prepared and subjected to the evaluation of the relationship between the elongation in an unvulcanized state and CW rating and the relationship between the elongation after vulcanization and the growth of the outer periphery of the tire.

Figure 12:
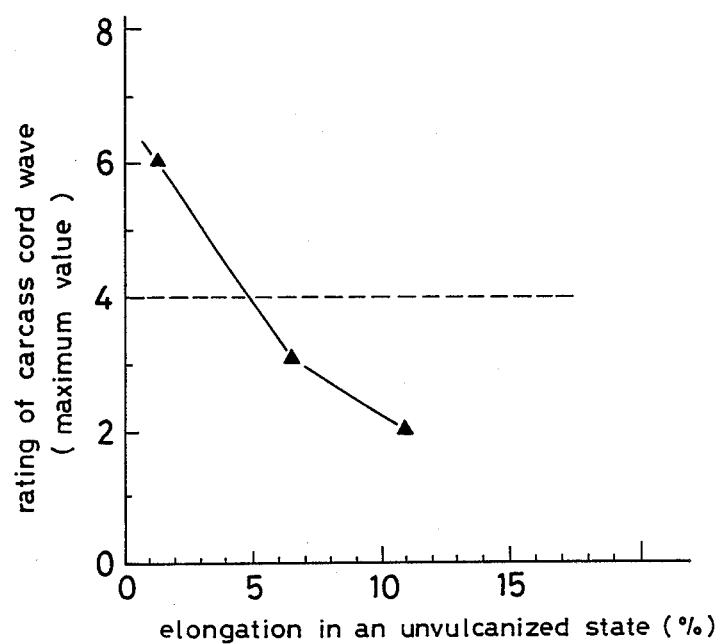
FIG. 12 is a graph showing the relationship between the elongation in an unvulcanized state and the rating of carcass cord wave (CW)

Tire samples tire size: 10.00 R 20
structure of belt layer: shown in FIGS. 1 and 9
carcass cord: $3+9+15$ $(0.175)^{1w}$
cord diameter: 1.17 mm
length of splice in the circumferential direction of the tire: l=120 mm,
organic fiber cord: 1500 D/2 of aromatic polyamide fiber cord (elongation of cord in an unvulcanized state under a load of 2.0 g/d: 1.3%); 1890 D/2 of nylon (elongation of cord in an unvulcanized state under a load of 2.0 g/d: 6.7% and 11% wherein the difference in the elongation is attributed to the difference in the method of twisting yarns); end count of 9.2 cords/cm
space between the organic fiber cord layer and the carcass layer: t=0.8 mm (1) Relationship between elongation in unvulcanized state and CW rating:

This relationship is shown in FIG. 12. It is apparent from FIG. 12 that when the elongation in an unvulcanized state under a load of 2.0 g/d is 5% or more, the tire exhibits a maximum value of 4 or less in the CW rating and therefore has excellent durability.

Figure 13:
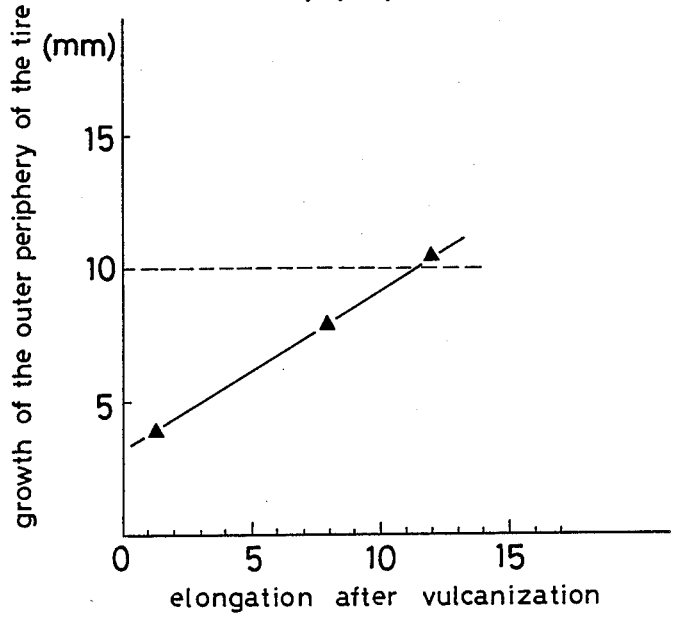
FIG. 13 is a graph showing the relationship between the elongation after vulcanization and the growth of the outer periphery of the tire.

(2) Relationship between elongation after vulcanization and growth of outer periphery of tire:

The growth of the outer periphery of the tire was measured after travelling of the tire for 10 hr under conditions of an inflation pressure of 7.2 kg/cm², a load of 2000 kg, a speed of 81 km/h, and a rim of 20×7.50 V by making use of an indoor drum tester. The results are shown in FIG. 13. Since the growth of the outer periphery of the tire should be 10 mm or less from the knowledge acquired up to date, it is apparent from FIG. 13 that the elongation after vulcanization is 11% or less.

It is noted that elongations of 1.3%, 6.7% and 11% in an unvulcanized state turn to elongations of 1.3%, 8.0% and 12% after vulcanization, respectively.

As described above, the present invention enables a remarkable improvement in the dimensional stability and the driving stability while maintaining excellent durability of the belt layer.

What is claimed is:

1. A pneumatic radial tire having a belt layer composed of at least three layers each made of a metallic cord and disposed between a carcass layer and a tread, wherein (1) cords constituting the second belt layer as numbered from the carcass layer towards the tread and cords constituting the third belt layer as numbered from the carcass layer towards the tread are each provided at an angle of 10° to 30° relative to the circumferential direction of the tire and cross each other, (2) the first belt layer is separated into two parts at the central region of a crown and respectively disposed on both shoulder portions, said first belt layer being provided at a cord angle of 40° to 75° relative to the circumferential direction of the tire, and (3) at least one organic fiber cord layer having a cord angle of 0° to 10° relative to the circumferential direction of the tire is provided in a circular form in the circumferential direction of the tire in a space formed by the separation into two parts of the first belt layer between the carcass layer and the second belt layer at the central region of the crown, the total tensile strength of the cords of the organic cord layer is 240 kg/cm or more, one end of said organic fiber cord layer in the circumferential direction of the tire and the other end thereof are each diagonally cut and the cut ends are lapped on each other to form a splice in such a manner that the distance in the circumferential direction of the tire between one end in the widthwise direction of each cut end and the other end thereof is 120 mm or more, the space between said organic fiber cord layer and said carcass layer being 0.8 mm or more before vulcanization.

2. A pneumatic radial tire according to claim 1, wherein the cords of the second belt layer and the cords of the third belt layer are provided respectively at cord angles of 24° to 30° and 10° to 16° relative to the circumferential direction of the tire and cross each other.

3. A pneumatic radial tire according to claim 1, wherein the elongation of the cords of said organic fiber cord layer under a load of 2.0 g/d is 5% or more in an unvulcanized state and 11% or less after vulcanization.

4. A pneumatic radial tire according to claim 1, wherein the space formed by the separation of the first belt layer at the central region of the crown is 25 to 45% of the ground-contacting area of the tread.

5. A pneumatic radial tire according to claim 1, wherein said organic fiber cord layer comprises cords selected from the group consisting of nylon, polyester or aromatic polyamide cords.

* * * * *